United States Patent [19]
Farris

[11] Patent Number: 5,215,319
[45] Date of Patent: Jun. 1, 1993

[54] SANITARY HANDLE FOR SHOPPING CARTS

[75] Inventor: Judy M. Farris, Midland, Tex.

[73] Assignee: Arrowhead Marketing, Inc., Midland, Tex.

[21] Appl. No.: 861,659

[22] Filed: Apr. 1, 1992

[51] Int. Cl.⁵ .................................................. B62B 3/02
[52] U.S. Cl. ................................... 280/33.992; 150/154
[58] Field of Search ...................... 280/33.991, 33.992, 280/33.993, DIG. 4, 304.1, 304.3; D6/580, 579, 575; 220/408, 410, 470; 297/227; 150/154, 165, 166; 29/235; 160/84.1; 206/825; 248/251, 252; 4/608, 609; 150/155

[56] References Cited

U.S. PATENT DOCUMENTS

| | | | |
|---|---|---|---|
| 2,803,849 | 8/1957 | Peters | 280/33.992 |
| 3,083,494 | 4/1963 | Lindenbaum | D6/580 |
| 3,866,649 | 2/1975 | Bringmann | 280/33.992 |
| 4,805,937 | 2/1989 | Boucher et al. | 280/33.992 |
| 4,881,746 | 11/1989 | Andreesen | 280/33.992 |

Primary Examiner—Richard M. Camby
Attorney, Agent, or Firm—Gunn, Lee & Miller

[57] ABSTRACT

The present invention shows a method for providing a disposable sanitary cover for the handle of a shopping cart. The cover is made from a flexible, semi-rigid material that has an inside diameter approximately equal to the outside diameter of the handle. Because the cover has a tubular body with a memory for returning to its prior shape, by pressing a slot cut the longitudinal length along the body against the handle for the shopping cart, the tubular body will open allowing the cover to enclose the handle of the shopping cart. After use, the disposable sanitary cover can be removed from the handle of the shopping cart. A notch may be cut in one end to allow for ease of installation of the cover. Individualized covers may be contained in separate sanitary packages.

3 Claims, 4 Drawing Sheets

SANITARY HANDLE FOR SHOPPING CARTS

BACKGROUND OF THE INVENTION

This invention relates to a sanitary handle cover and, more particularly, to a sanitary handle cover for shopping carts that can be used in the typical supermarket.

BRIEF DESCRIPTION OF THE PRIOR ART

Most of the public in the United States buys groceries at supermarkets. Probably just about everyone has grabbed one of the shopping carts at a supermarket and pushed it around while buying groceries and other items. The handle of the shopping cart is tubular in shape and is normally made from a tubular metal product. Everyone else that has previously used the shopping cart grabs the handle at the same place while pushing the shopping cart.

Because the shopping carts will be used for years and because the shopping carts are either never cleaned or not cleaned in a sanitary manner, germs can be passed from one shopper to the next. In other words, a person using the shopping cart previously may have had a communicable disease. Shoppers using that same cart thereafter will be grabbing the same shopping cart handle in the same manner as the person who had the communicable disease. Young children and infants are especially at risk as they are placed in the seat of the shopping cart where they inevitably put their mouths on the handle or put their hands in their mouths after having them on the handle. As medical science tells us, many diseases are susceptible to being transmitted by hand contact, such as staff and strep bacteria and numerous flu viruses. For example, in restaurants, employees are required to always wash their hands after using the restroom. If this is not done, communicable diseases can be transmitted to patrons of the restaurant by the restaurant employees.

In a grocery store, the shoppers many times pick up and feel the merchandise the shoppers are inspecting prior to purchase. The shopper may or may not actually purchase each food item they pick up, apples being a typical example. Thereafter, someone else may pick up the apple, buy it, and eat it without ever washing the apple. Therefore, an individual who had a highly communicable disease that had been pushing a shopping cart may have endless possibilities of transmitting the communicable disease to the food products being inspected either through his handling of the food product or the subsequent shoppers using his cart.

In the past, about the only thing a shopper could do would be to bring something to wipe off the handle of the shopping cart prior to using a particular shopping cart. However, this did nothing to solve the problem concerning the hundreds of other shoppers that my have already grabbed the shopping handle and thereafter picked up and inspected food products the shoppers are interested in purchasing. The only other possibility the shopper had was to possible wear some type of gloves while shopping.

SUMMARY OF THE INVENTION

It is an object of the present invention to provide a sanitary cover for a shopping cart handle.

It is a further object of the present invention to provide a disposable, semi-rigid handle cover that may be placed over the handle of the shopping cart prior to use by each individual patron.

It is yet another object of the present invention to provide a method of covering the handle of a shopping cart with a sanitized product prior to use.

In one embodiment of the invention, a semi-rigid product such as a semi-rigid plastic is formed in a tubular manner by extruding. The tubular product is cut longitudinally on one side. The internal diameter of the semi-rigid tube is approximately equal to the external diameter of a typical shopping cart. By notching one end of the semi-rigid tube, it can easily be inserted over the handle of a shopping cart without actually touching the shopping cart handle. The semi-rigid tube can also be packaged in self-contained, sanitary disposable packages. By simply opening the package, a sanitary handle cover for the shopping cart is provided.

In an alternative embodiment, a flexible covering such as plastic wrap can be wrapped over the shopping cart handle. The plastic wrap could be replaced between each user of the shopping cart. However, the use of plastic wrap has a disadvantage in that the next user must either touch the plastic wrap of the prior user or grab hold of the cart while applying or removing the plastic wrap.

In another alternative embodiment, a terry cloth cover may be used around the handle of the shopping cart. The terry cloth cover could be held in position by Velcro. The terry cloth cover could then be taken home and washed after usage.

DESCRIPTION OF THE PREFERRED EMBODIMENT

Figure 1:
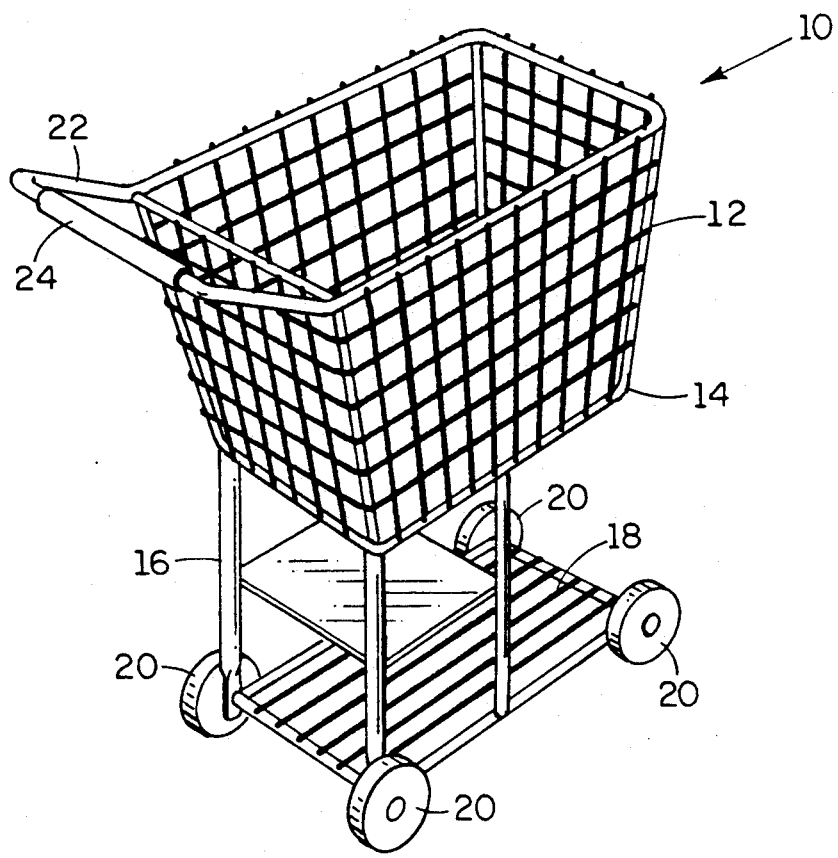
FIG. 1 is a perspective view of a shopping cart with the sanitary handle cover located thereon.

Referring now to FIG. 1 of the drawings, everyone is familiar with the typical shopping cart represented by reference number 10. The shopping cart 10 normally has a wire upper basket 12 that is secured around a frame 14. The frame 14 generally has some type of post 16 that extends down to a bottom tray 18. Connected to the bottom tray 18 are wheels 20.

Along the upper rear portion of the frame 14 is a handle 22 that is formed from tubular metal such as aluminum. In the illustration as shown in FIG. 1, the handle 22 has a handle cover 24 thereon made in accordance with the present invention. The handle cover 24 is made from a flexible tubular member as will be described in more detail hereinbelow.

Figure 2:
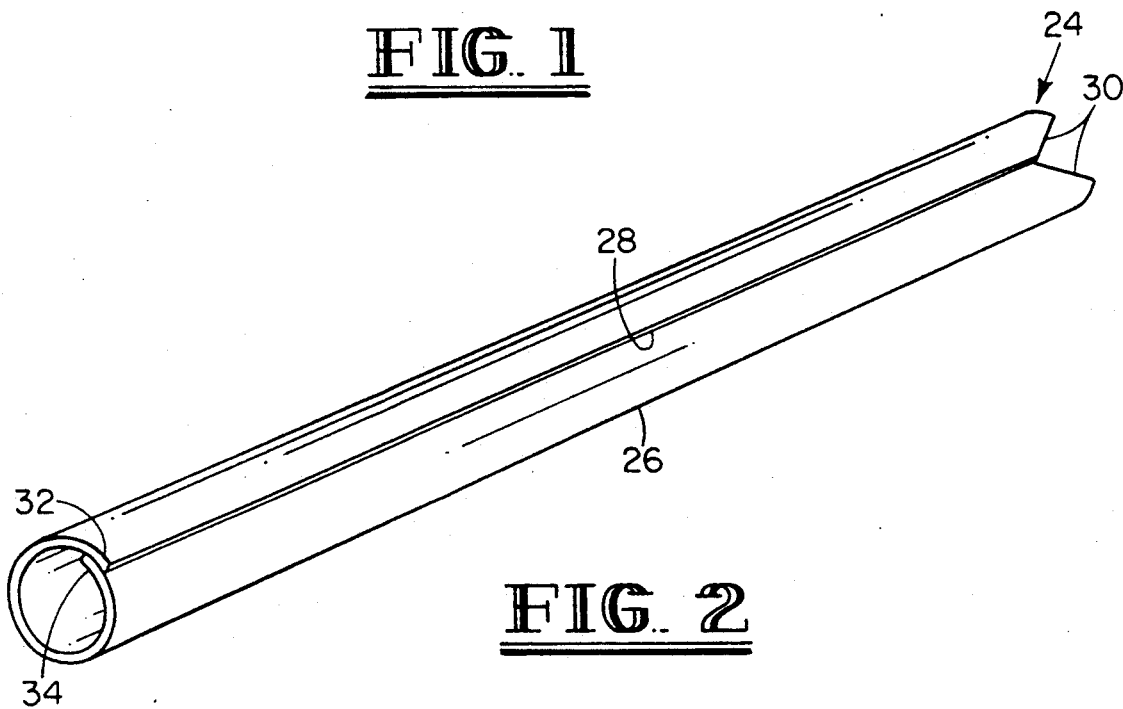
FIG. 2 is a perspective view of a semi-rigid, overlapping, tubular type sanitary handle cover that can be used with a typical shopping cart.

Referring to FIG. 2, the handle cover 24 as previously shown in FIG. 1 is shown in an enlarged perspective view. The handle cover 24 has an elongated tubular body 26 that has a slot 28 cut longitudinally the entire length of the elongated tubular body. At one end of the slot 28 is cut a notch 30 as illustrated in FIG. 2.

Figure 3:
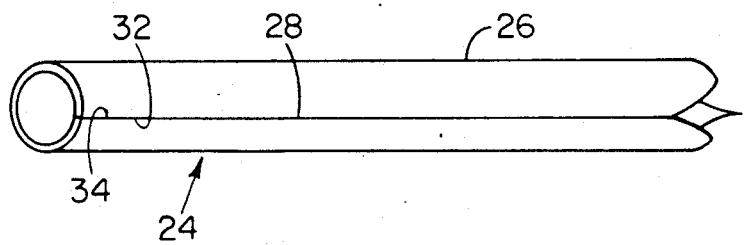
FIG. 3 is a perspective of an alternative semi-rigid tubular type sanitary handle cover that can be used with a typical shopping cart.

Depending upon the type of material used, upon cutting the slot 28 in the elongated tubular body 26 of the handle cover 24, one side 32 of the elongated tubular body 26 may have a tendency to overlap the second side 34. However, this depends upon the material from which the handle cover 24 is formed and how it is formed. On some tubular members, after the cutting of the slot 28, one side 32 would simply remain in abutment against the second side 34 as shown in FIG. 3.

Figure 4A:
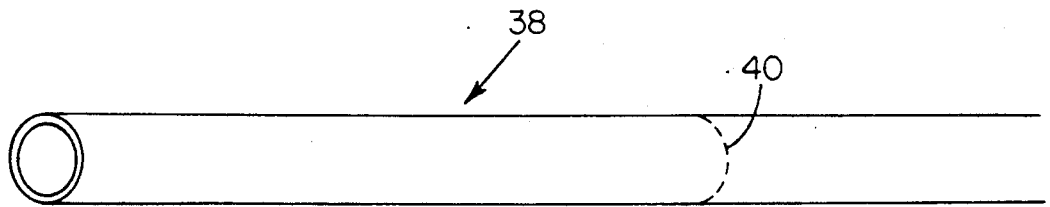
FIGS. 4A and 4B are sequential perspective views illustrating the cutting and notching of the tubular handle cover.
Figure 4B:
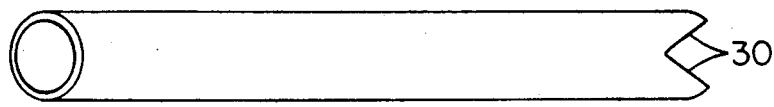

Typically, the handle cover 24 would be formed from some type of plastic or petroleum product. The handle cover 24 may be extruded from an extruder (not shown) in a conventional manner. From the extruder a tubular piece 38 is extruded as shown in FIG. 4A. The tubular piece 38 may then be cut at predetermined lengths as indicated by reference line 40. After the cutting along reference line 40, the notch 30 may be cut in one end thereof as illustrated in FIG. 4B. Thereafter the slot 28 is cut from the notch 30 the entire length to form the handle cover 24. In this embodiment of handle cover 24 as shown in FIG. 3, side 32 abuts against side 34. Again, this depends upon the type of material and the method of forming the handle cover 24.

Also, another way of forming the handle cover 24 is to have the slot 28 formed at the time of extrusion. Thereafter all that has to occur is the cutting of the tubular piece 38 to the desired length and notching at one end of the slot 28.

The handle cover 24 may be formed by any of a number of methods without departing from the spirit and scope of the present invention. What is desired is that the handle cover 24 be an economical, disposable, semi-rigid tubular device that can fit over the handle 22 of a typical shopping cart 10.

Figure 5:
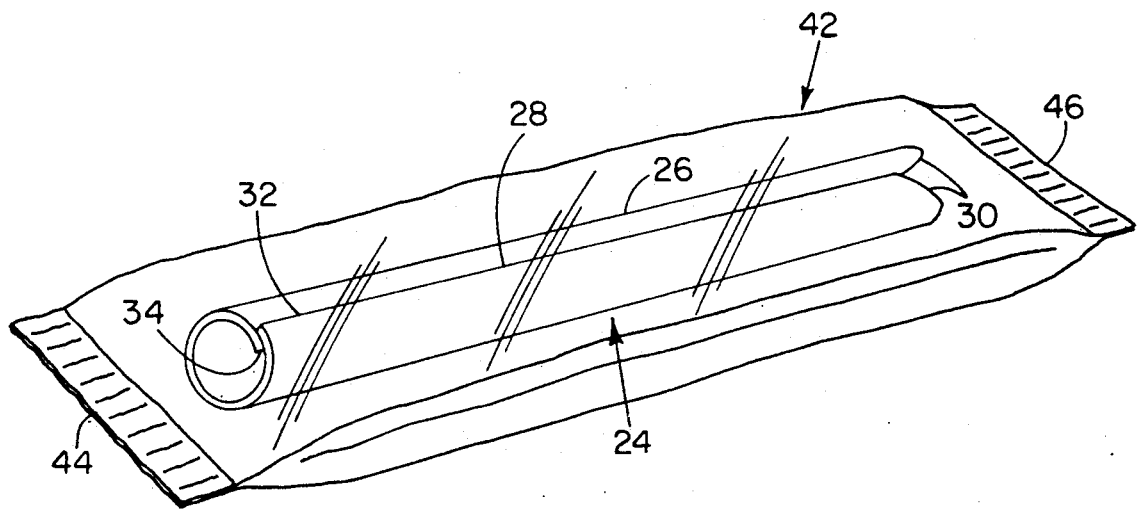
FIG. 5 is an illustrative view of the handle cover as contained in sanitary packaging.

The handle 24 should, if not in an already sanitary condition, be sanitized and put in a sealed package 42 as illustrated in FIG. 5. It is presently envisioned that each of the handle covers 24 would be placed in their individual sealed package 42 rather than being collected together and packaged in groups. The sealed package 42 can be of a typical tubular nature having heat seals 44 and 46 on each end thereof.

Figure 6:
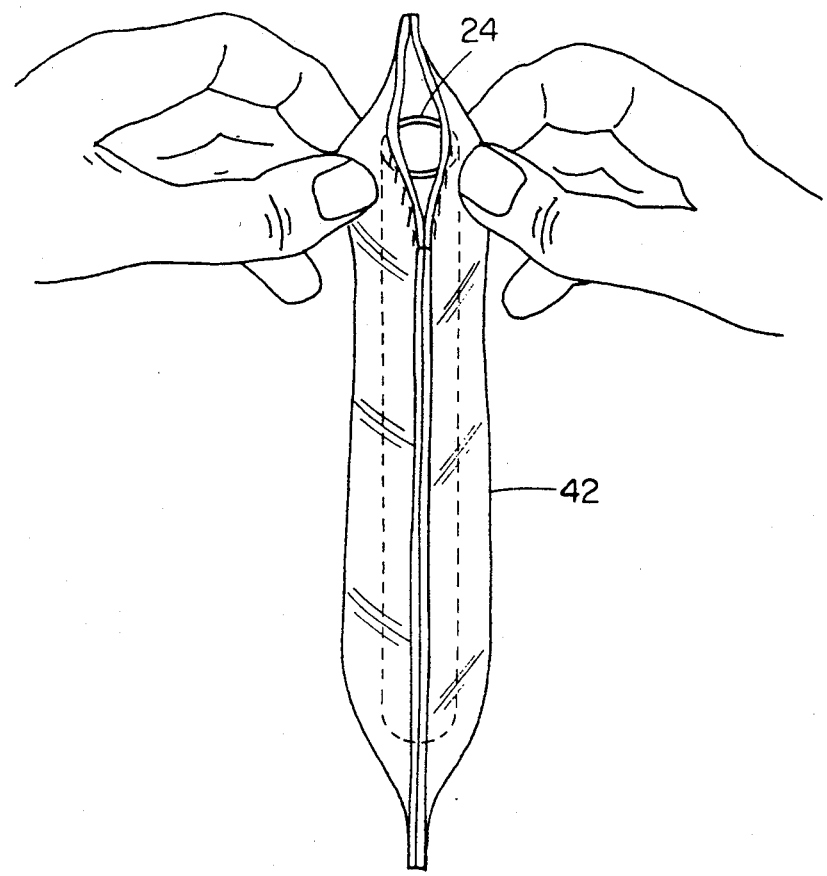
FIG. 6 is a pictorial illustration of removing the handle cover from its sanitary packaging.
Figure 7:
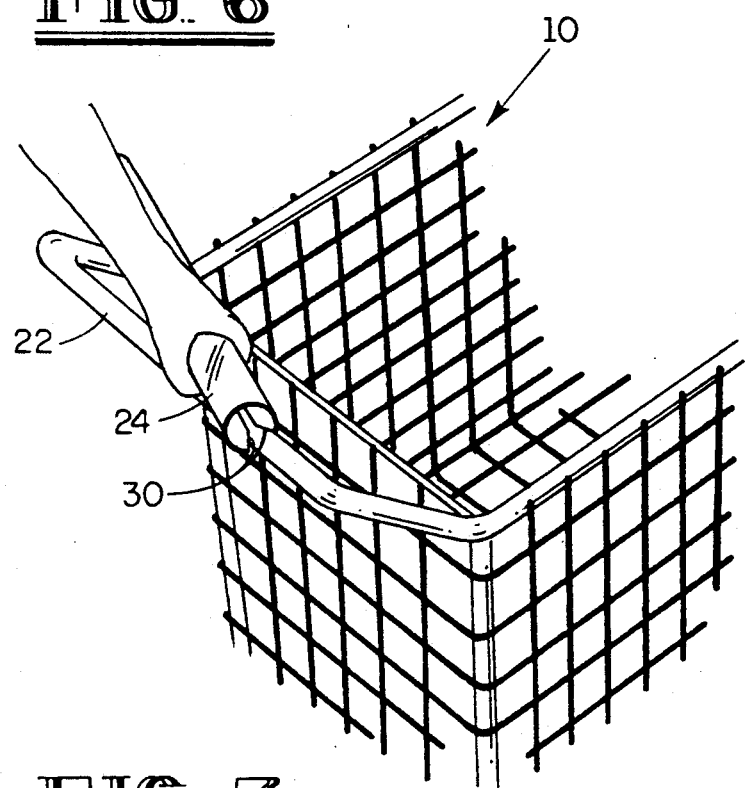
FIG. 7 is a pictorial illustration of how the handle cover may be inserted over the shopping cart handle without touching the shopping cart.

In actual use, the sealed package 42 is pulled from either side as illustrated in FIG. 6 to break the seal. Thereafter the handle cover 24 may be removed from the sealed package. The handle cover 24 is then inserted over the handle 22 of the shopping cart 10 in the manner illustrated in FIG. 7 by pressing the notch 30 against the handle 22 of the shopping cart 10. This causes the handle cover 24 to be forced open and around the handle 22. Thereafter the handle cover 24 will fit on the shopping cart 10 as pictorially illustrated in FIG. 1.

After use of the shopping cart with the handle cover 24, the handle cover 24 can easily be removed by pulling against the end of the handle cover that has the notch 30 therein. Again, the handle cover 24 will open along the slot 28 allowing it to be removed from the handle 22.

Figure 8:
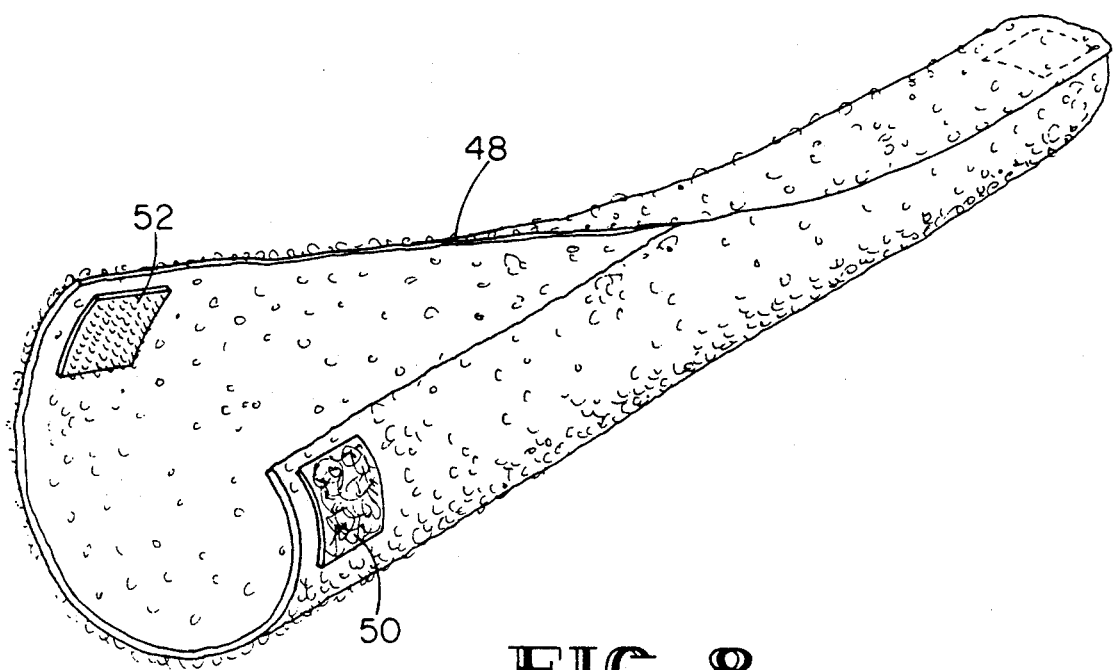
FIG. 8 is a perspective view of a terry cloth cover that can be used with shopping carts.
Figure 9:
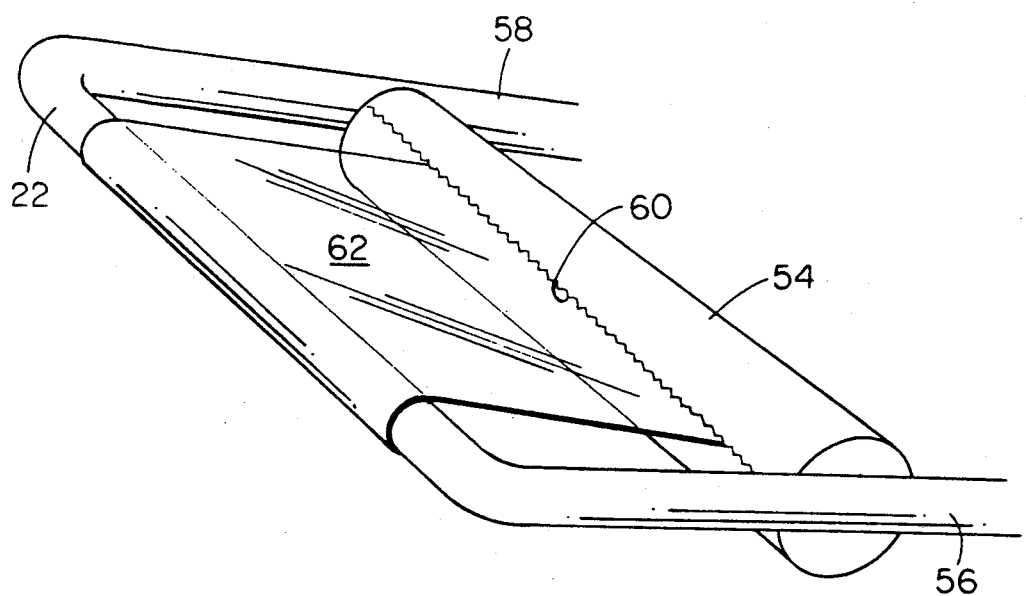
FIG. 9 is a perspective view of a protective covering such as plastic wrap that can be used over a shopping cart handle.

FIG. 8 is an alternative embodiment of the present invention. In FIG. 8, a terry cloth 48 is cut to approximately the same length as the previously described handle cover 24. The width of the terry cloth 48 is slightly larger than the circumference of the handle 22 of the shopping cart 10, but less than twice the circumference. On each end of the terry cloth 48 is located a Velcro strip 50 and Velcro hooks 52. By use of the terry cloth 48 type handle cover, it can be placed over the handle 22 of any typical shopping cart 10, used and then removed and taken home to be washed for further use. It also could be thrown away.

In another alternative embodiment of the present invention, the handle 22 of the shopping cart 10 has a roll 54 between each of the supports 56 and 58 of the handle 22. The roll 54 can be of a material such as plastic wrap and have a cutting edge 60. Now, when a new user of the shopping cart comes up, he can unroll the plastic wrap 62 from the roll 54 and cut it with the cutting edge and now have a protective cover over the handle 22.

However, both of the alternative embodiments have limitations that would require touching of the shopping cart during usage, though the alternative embodiments would provide some minimal amount of sanitary protection while using the shopping cart.

I claim:

1. A disposable sanitary cover for a handle of a shopping cart, the handle having a generally straight cylindrical portion with a generally uniform outside diameter, said disposable sanitary cover comprising:

a tubular body formed from a semi-rigid, flexible material that has a memory concerning its prior shape;

a slot cut through one side of said tubular body along an entire longitudinal length of said tubular body;

notch cut in at least one end of said tubular body, said notch being located at said slot in said tubular body; and sanitary wrapping for enclosing said tubular body therein, said tubular body being sanitized prior to said enclosing in said sanitary wrapping;

said tubular body having an inside diameter approximately equal to said outside diameter of said handle of said shopping cart, said tubular body being constructed so that upon pressing said notch and said slot against said handle of said shopping cart, said tubular body will flex open to receive said handle of said shopping cart therein.

2. The disposable sanitary cover for said handle of said shopping cart as recited in claim 1 wherein said tubular body is made from an extruded petroleum product.

3. The disposable sanitary cover for said handle of said shopping cart as recited in claim 2 where edges of said tubular body are rounded for ease of installing and to avoid cuts.

* * * * *